(12) United States Patent
Maehara (10) Patent No.: US 6,408,994 B1
(45) Date of Patent: Jun. 25, 2002

(54) DRUM BRAKE

(75) Inventor: Toshifumi Maehara, Tokyo (JP)

(73) Assignee: Akebon O Brake Industry Co., Ltd., Tokyo (JP)

( * ) Notice: Subject to any disclaimer, the term of this patent is extended or adjusted under 35 U.S.C. 154(b) by 0 days.

(21) Appl. No.: 10/032,487

(22) Filed: Jan. 2, 2002

(30) Foreign Application Priority Data

Jan. 4, 2001 (JP) .................................. 2001-000186

(51) Int. Cl.[7] .............................................. F16D 65/34
(52) U.S. Cl. ...................................... 188/156; 188/325
(58) Field of Search ................................ 188/156, 158, 188/162, 325

(56) References Cited

U.S. PATENT DOCUMENTS 5,024,299 A * 6/1991 Shaw et al. ................. 188/156
5,219,049 A * 6/1993 Unterborn ................... 188/156
5,310,026 A * 5/1994 Shaw et al. ................. 188/156
5,823,636 A * 10/1998 Parker et al. ................. 303/3

* cited by examiner

*Primary Examiner*—Christoper P. Schwartz
(74) *Attorney, Agent, or Firm*—Morgan, Lewis & Bockius LLP (57) ABSTRACT

In a drum brake, a damper spring is provided for transmitting a shoe operating force outputted from a power lever to an input lever and for absorbing an impact force transmitted from brake shoes to the power lever via a link mechanism. The damper spring is mounted between the power lever driven by an electric motor of an operating force producing mechanism and the input lever of the link mechanism for receiving the shoe operating force outputted from the power lever for driving the shoes.

8 Claims, 5 Drawing Sheets

DRUM BRAKE

BACKGROUND OF THE INVENTION

1. Field of the Invention

The present invention relates to a drum brake. Specifically, the present invention relates to an improvement in realizing downsizing and reduction in power consumption of an electric motor used in an operating force producing mechanism in a drum brake, including the operating force producing mechanism for driving a power lever constituting an output portion of shoe operating force by the electric motor and a link mechanism for driving a shoe for controlling press force of the brake shoe exerted to a drum in accordance with brake force exerted to an anchor portion.

2. Description of the Related Art

Conventionally, there have been used various types of drum drakes for braking running of a vehicle and the drum brakes are classified into a leading trailing type, a two leading shoe type and a duo-servo type or the like in accordance with an arrangement of a brake shoe pressed to an inner peripheral face of a drum having substantially a cylindrical shape.

A drum brake of a duo-servo type is generally provided with a pair of brake shoes of a primary shoe and a secondary shoe arranged opposedly to each other in a drum having a cylindrical shape.

An inlet side of the primary shoe in a forward rotational direction of a drum is made to constitute on input portion and an outlet side thereof in the forward rotational direction of the drum is connected to an inlet side of the secondary shoe via an adjuster. Meanwhile, an outlet side of the secondary shoe is brought into contact with an anchor portion mounted on a backing plate and brake force (brake torque) operated to the primary shoe and the secondary shoe is received by the anchor portion.

Thereby, when the primary shoe and the secondary shoe are expanded and pressed to an inner peripheral face of the drum, the brake force operated to the primary shoe is inputted to the input side of the secondary shoe to operate the secondary shoe to press to the inner peripheral face of the drum and therefore, both of the primary shoe and the secondary shoe operate as leading shoes and brake force having very high gain can be achieved.

In comparison with a brake drum of a leading trailing type or a two leading shoe type, the above-described duo-servo type drum brake is provided with a number of advantages in which not only extremely high brake force can be achieved but also the brake drum is easy to downsize and integration of a parking brake is facilitated and so on.

However, such a duo-servo type drum brake is sensitive to a change in frictional coefficient of a lining of the brake shoe and, the brake force tends to be difficult to stabilize. Accordingly, a device for stabilizing the brake force is requested.

In view of such background, the applicant has already proposed a number of technologies for stabilizing brake force by controlling an output of a hydraulic type wheel cylinder operating to expand a pair of brake shoes in accordance with anchor reaction force.

Meanwhile, according to a brake apparatus of a vehicle in recent times, there is actively carried out intelligent formation of a brake function such as mounting of an anti-lock brake system or mounting of a traction control system. Further, in order to correspond to such intelligent formation, electric movement formation of a brake apparatus has been progressed.

Hence, the applicant has been carried out research and development of a drum brake for producing shoe operating force by a power lever driven by an electric motor and transmitting the shoe operating force produced by the power lever to respective brake shoe via a link mechanism.

The brake apparatus of such a constitution is suitable for the intelligent formation of the brake function by electric movement formation of a drive source. Further, when the link mechanism interposed between the power brake and the brake shoe is devised, the brake force can also be stabilized by restricting the shoe operating force produced by the power lever in accordance with the brake force, which is applicable to both of electric movement formation of the duo-servo type drum brake and stabilization of the brake force.

Meanwhile, in the case of the drum brake, the brake torque operated to the brake shoe in braking is varied by eccentricity of the drum or the like. The variation of torque caused by eccentricity of the drum or the like is a phenomenon occurring in an extremely short period of time and therefore, the rapid torque variation reacts to the link mechanism or the power lever supporting to press the brake shoe as impact force.

Hence, according to the conventional drum brake constituting the drive source by the electric motor, there is taken a countermeasure of giving allowance to allowable torque of the electric motor or promoting impact resistance of the electric motor such that the impact force derived from the torque variation does not constitute excessive load for the electric motor. However, such countermeasures constitute a factor for resulting in a large-size electric motor, and a brake apparatus becomes large and increases its weight.

Further, according to the conventional drum brake constituting the drive source by the electric motor, a power transmitting mechanism between the link mechanism for operating to expand the brake shoe and an output shaft of the electric motor is constructed by a reversible structure capable of transmitting power in two directions of a motor output transmitting direction for transmitting the output of the motor to the brake shoe and a brake torque transmitting direction for transmitting the torque operating to the brake shoe to the side of the motor in braking. Therefore, there also poses a problem that when constant brake force is maintained in, for example, stopping a vehicle or the like, electricity conduction is obliged to continue in the electric motor, power consumption of the electric motor is increased and load to a battery or a generator mounted to the vehicle is increased.

SUMMARY OF THE INVENTION

The invention has been carried out in view of the above-described situation. Accordingly, it is an object of the present invention to provide a drum brake capable of realizing downsizing of an electric motor so that impact resistance of the electric motor caused by torque variation in braking can be promoted without achieving an increase in an allowable torque and promotion of impact resistance of the electric motor per se. Further, it is an object of the present invention to provide a drum brake capable of achieving a reduction in power consumption of the electric motor so that a drum brake capable of maintaining brake force even when electricity conduction to the electric motor is stopped in braking. Specifically, the reduction in power consumption can be achieved so that a power transmitting mechanism between the electric motor and a link mechanism for operating to expand a brake shoe is made irreversible by which although an output of the motor is transmitted to the link mechanism, torque transmission from the link mechanism to the side of the electric motor is restricted.

In order to achieve the above-described object, according to the present invention, there is provided a drum brake including a pair of brake shoes opposedly arranged inside a drum; an operating force producing mechanism for driving a power lever constituting an output portion of a shoe operating force by an electric motor; a link mechanism for driving the shoes having an input lever for receiving the shoe operating force outputted from the power lever, wherein the link mechanism presses the pair of brake shoes to a drum and operates a brake restricting force to the input lever in a direction of a reducing operation of the shoe operating force in accordance with a brake force operated from the brake shoes to an anchor portion for controlling a press force of the respective brake shoes to the drum. The drum brake further includes a damper spring between the power lever and the input lever. The damper spring transmits the shoe operating force outputted from the power lever to the input lever and absorbs an impact force transmitted from the brake shoes to the power lever via the link mechanism in braking.

According to the above-described constitution, when the impact force is transmitted from a side of the brake shoes to the operating force producing mechanism via the link mechanism by rapid torque variation caused by eccentricity of the drum or the like in braking, the impact force is absorbed by elastically deforming the damper spring arranged between the input lever of the link mechanism and the power lever.

Therefore, the impact force is absorbed between the input lever and the power lever and is not transmitted to the electric motor of the operating force producing mechanism via the power lever.

Further, preferably, in the drum brake, plural pieces of the damper springs may be arranged in parallel between the power lever and the input lever.

When constituted in this way, assuming, for example, compression coil springs as the damper spring, in comparison with a case of constituting the damper spring by a single spring, a large spring constant can be ensured by small dimensions by an amount of reducing a diameter of winding the individual coil spring. Further, there is also promoted a degree of freedom of arranging parts such as distributing and arranging, for example, the respective compression coil springs at vacant spaces on both sides of the power lever.

Further, preferably, in the drum brake, the damper spring may be set with a spring constant such that a change in a deceleration by the impact force transmitted from the brake shoes to the power lever via the link mechanism in braking becomes equal to or smaller than 0.05 G.

When the change in the deceleration is restrained to the degree that kickback or the like accompanied by the change in the deceleration becomes very weak to a degree which cannot be felt by a driver or the like.

Further preferably, in the operating force is producing mechanism of the drum brake, a power transmitting system for transmitting an output of the electric motor to the power lever is constituted by integrating a worm wheel apparatus for preventing power from being transmitted from a side of the power lever to a side of the electric motor.

When constituted in this way, the power transmission mechanism between the link mechanism and the electric motor for operating to expand the brake shoes is made irreversible by which although the output of the motor is transmitted to the link mechanism, the torque is restricted from being transmitted from the link mechanism to the side of the electric motor. Accordingly, even when electricity conduction to the electric motor is stopped in braking, the braking force can be maintained.

DETAILED DESCRIPTION OF THE PREFERRED EMBODIMENTS

A detailed explanation will be given of a preferable embodiment of a drum brake according to the present invention in reference to the drawings.

Figure 1:
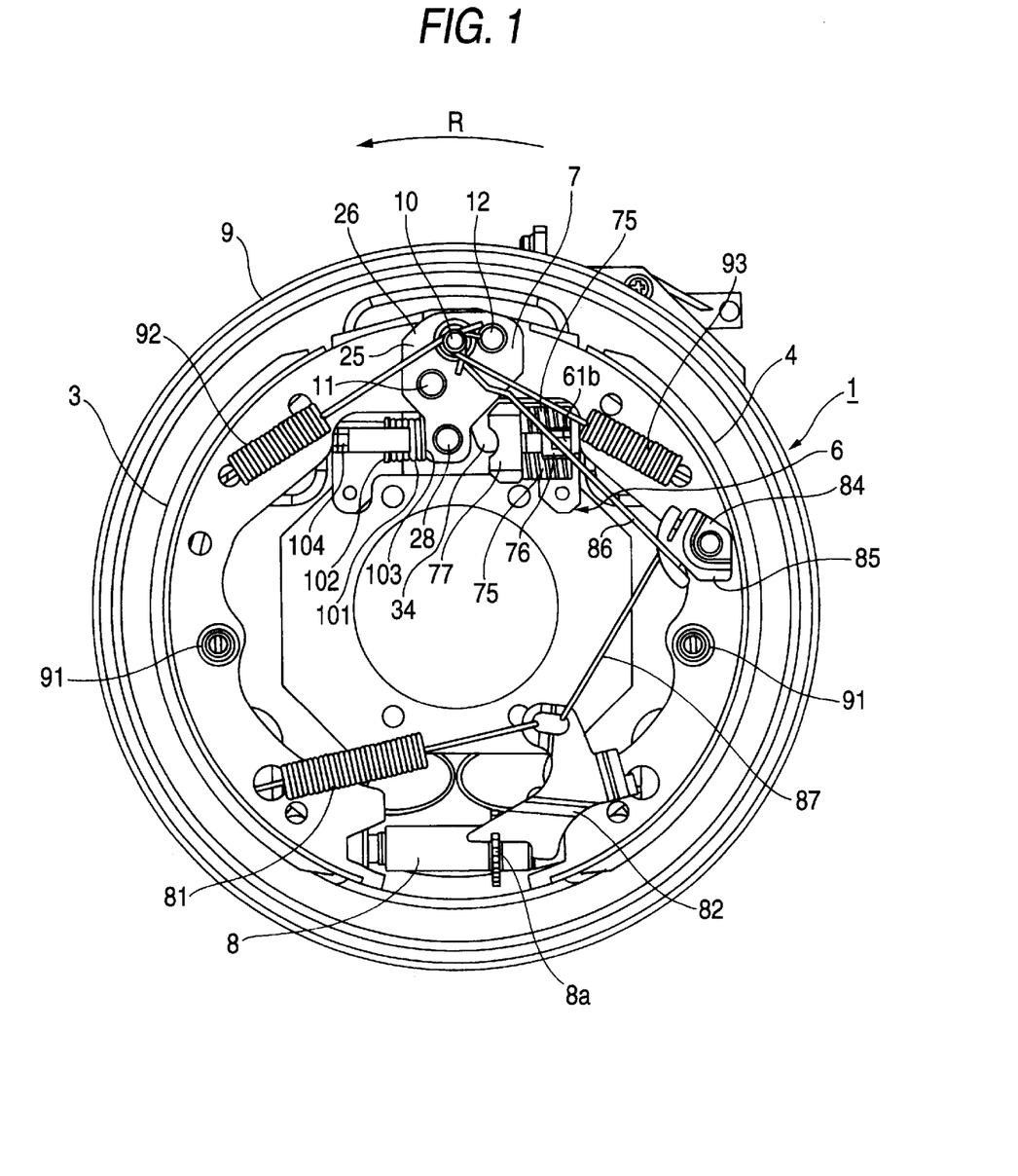
FIG. 1 is a front view of an embodiment of a drum brake according to the present invention.
Figure 2:
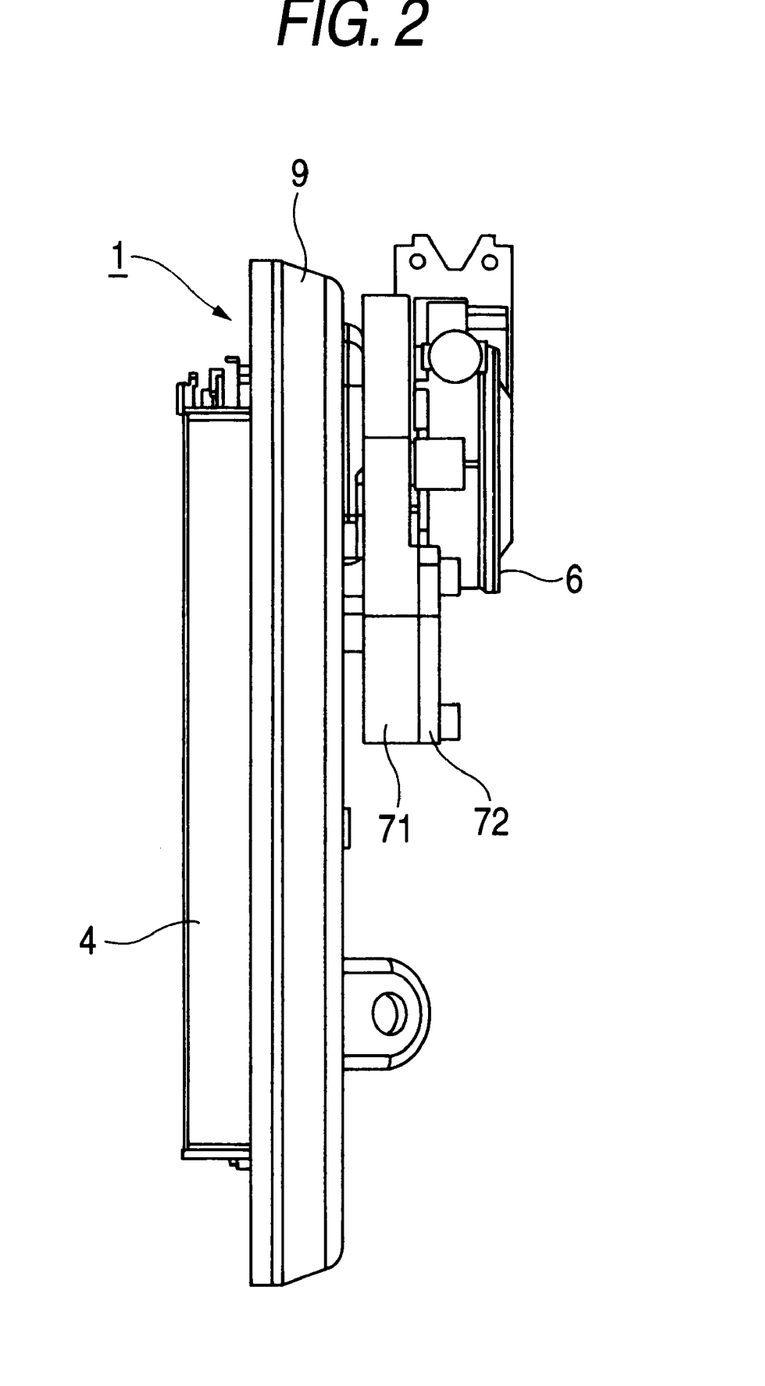
FIG. 2 is a side view of the drum brake shown in FIG. 1.
Figure 3:
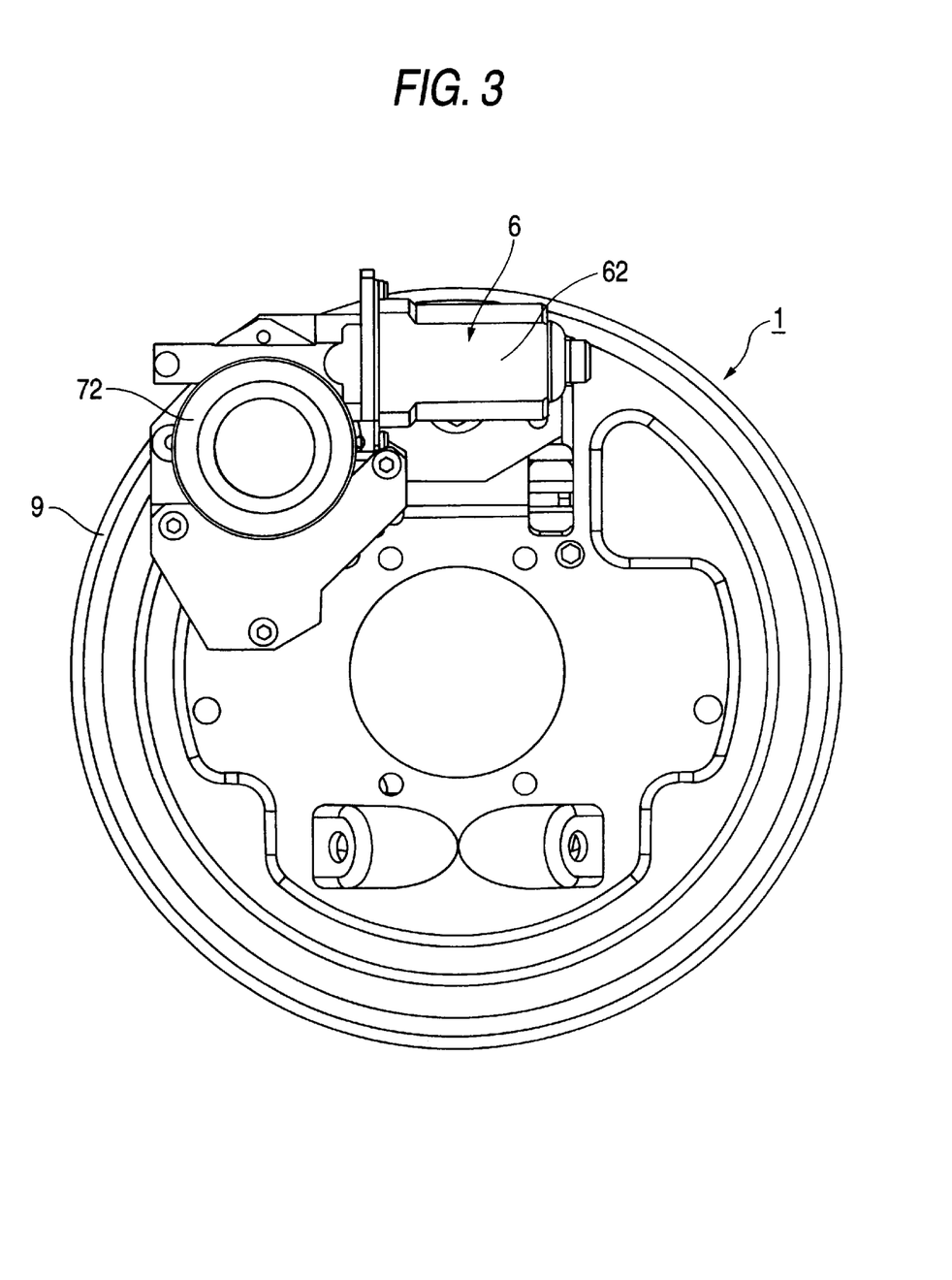
FIG. 3 is a rear view of the drum brake shown in FIG. 1.
Figure 4:
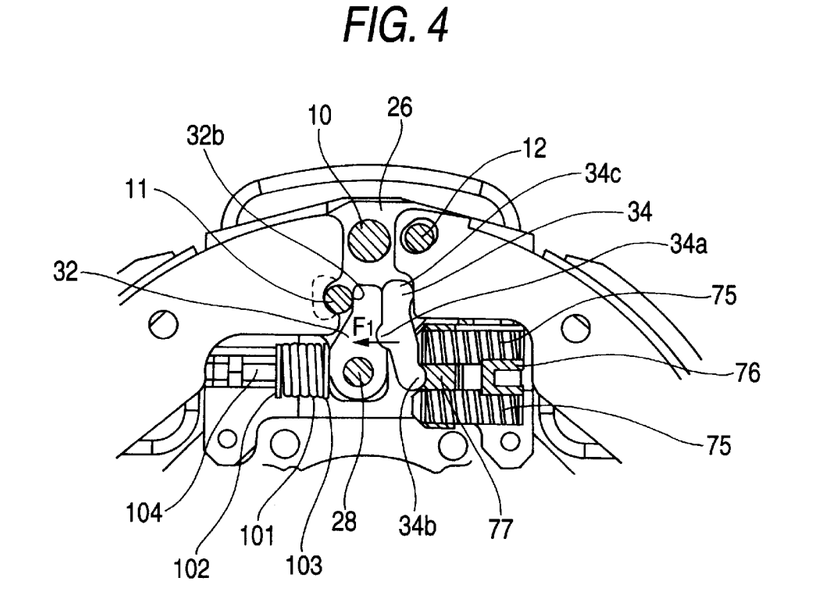
FIG. 4 is a detailed view of a link mechanism of the drum brake shown in FIG. 1.
Figure 5:
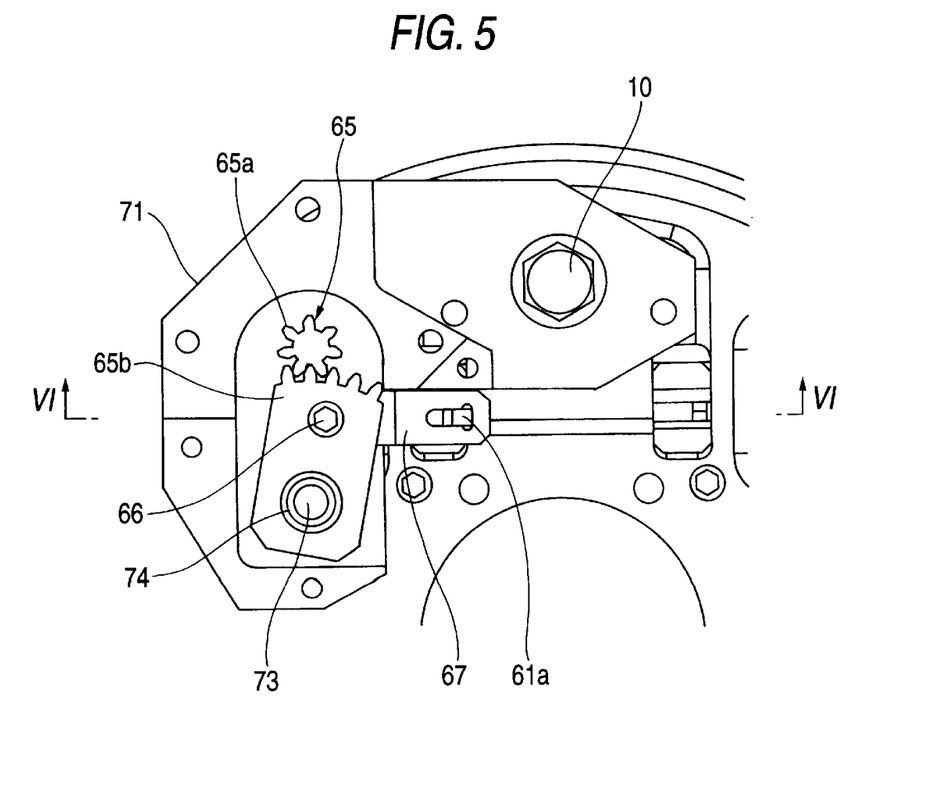
FIG. 5 is a detailed view of showing a constitution of an operating force producing mechanism shown in FIG. 3.
Figure 6:
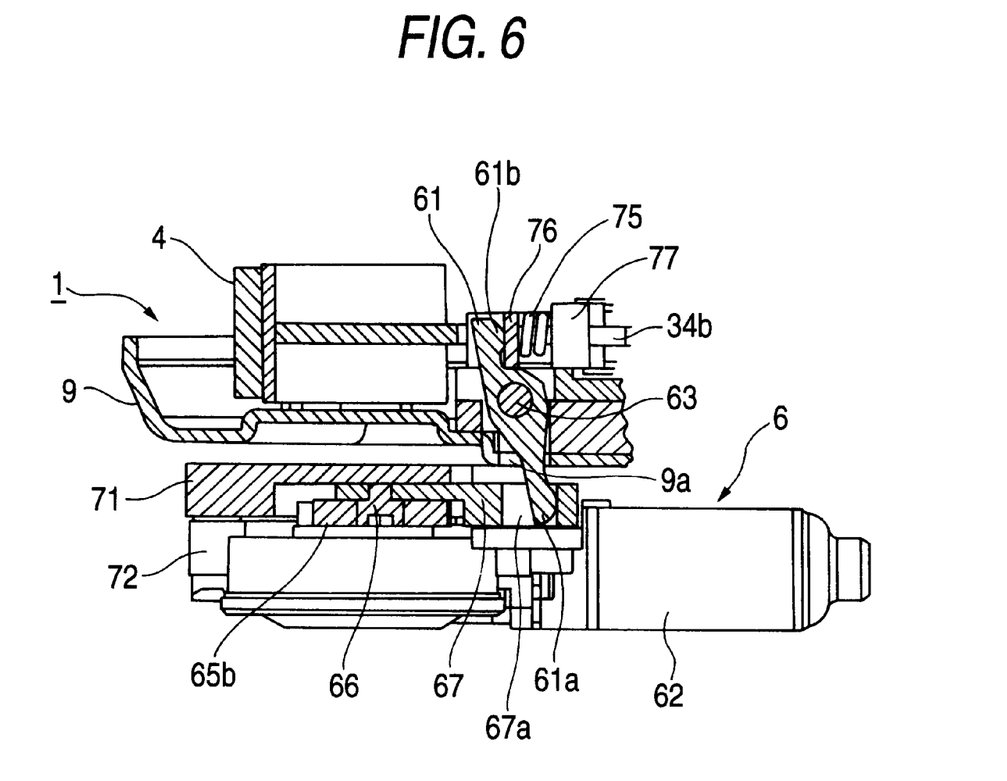
FIG. 6 is a sectional view taken along a line VI—VI of FIG. 5.

FIG. 1 through FIG. 6 show an embodiment of a drum brake according to the present invention, FIG. 1 is a front view of a drum brake according to the present invention, FIG. 2 is a side view of the drum brake, FIG. 3 is a rear view of the drum brake, FIG. 4 is a detailed view of a link mechanism of the drum brake shown in FIG. 1, FIG. 5 is a detailed view showing a constitution of an operating force producing mechanism shown in FIG. 3, and FIG. 6 is a sectional view taken along a line VI—VI of FIG. 5.

The drum brake 1 is a so-to-speak duo-servo type drum brake 1 and is provided with a pair of brake shoes 3 and 4 of the primary shoe 3 and the secondary shoe 4 opposedly arranged in a space inside a drum having substantially a cylindrical shape, not illustrated; an operating force producing mechanism 6 arranged on one side of opposed ends the pair of brake shoes 3 and 4 for producing shoe operating force for pressing the respective brake shoes 3 and 4 to the drum; a link mechanism 7 for driving shoes by transmitting operating force produced by the operating force producing mechanism 6 to the respective brake shoes 3 and 4; an adjuster unit 8 arranged between opposed ends of the respective brake shoes 3 and 4 on the other side and serving also as a link function for inputting an output of the primary shoe 3 to the secondary shoe 4; a backing plate 9 for supporting these constituent members; and an anchor pin 10 erected on the backing plate 9.

Further, the drum, not illustrated, is mounted substantially concentrically with the backing plate 9 and is rotated in a direction of an arrow R when a vehicle moves forwardly.

The above-described brake shoes 3 and 4 are attached to the backing plate 9 by shoe hold down devices 91 movably toward an inner periphery of the drum.

Further, end portions of the respective brake shoes 3 and 4 on the side of the operating force producing mechanism 6 are connected to the anchor pin 10 via shoe return springs 92 and 93 and are urged in directions in which the respective end portions of the shoes approach each other (that is, directions of separating from the drum).

Further, end portions of the respective brake shoes 3 and 4 on the side of the adjuster unit 8 are urged by urging force of an adjuster spring 81 to maintain a state of being brought into contact with the end portions of the adjuster unit 8.

According to the operating force producing mechanism 6, as shown in FIG. 5 and FIG. 6, a power lever 61 constituting an output portion of shoe operating force is driven by an electric motor 62. The power lever 61 is arranged to be inserted to a lever insertion hole 9a formed to penetrate the backing plate 9 and a middle portion thereof is pivotably supported by a lever shaft 63 supported by the backing plate 9.

As shown in FIG. 5, rotational movement of the electric motor 62 is transmitted to a worm gear device 65 constituted by a worm 65a connected to an output shaft of the motor and a worm wheel 65b in mesh with the worm 65a. The worm 65a and the worm wheel 65b are contained in a containing portion formed by a housing 71 and a cover 72 coupled to an outer case of the electric motor 62. The worm wheel 65b is rotatably connected to a shaft 73 supported by the housing 71 via a bearing 74.

The worm wheel 65b is connected with a slide lever 67 via a lever pin 66. The slide lever 67 is slidably engaged with a linear guide groove formed at the housing 71 and is displaced to slide in accordance with a rotational amount of the worm wheel 65b.

Further, a lever insertion hole 67a is formed to penetrate a front end portion of the slide lever 67 and one end portion 61a of the power lever 61 is fitted to the lever insertion hole 67a.

The slide lever 67 converts rotation of the worm wheel 65b into linear movement and transmits the linear movement to the one end portion 61a of the power lever 61 to thereby make the power lever 61 execute pivotal operation.

Other end portion 61b of the power lever 61 is a portion for outputting drive force transmitted from the worm wheel 65b to an input lever 34 of the link mechanism 7 as shoe operating force.

In the case of the embodiment, as shown by FIG. 6, between the other end portion 61b of the power lever 61 and the input lever 34 of the link mechanism 7, there is mounted a damper spring 75 for absorbing impact force transmitted from the brake shoes 3 and 4 to the power lever 61 via the link mechanism 7 in braking.

Further, in the case of the embodiment, the damper spring 75 is constituted by two pieces of compression coil springs arranged between the power lever 61 and the input lever 34 in parallel with each other. The damper springs 75 are arranged to sandwich the power lever 61 therebetween, and a guide plate 76 constituting a spring seat for receiving an end portion of the damper spring 75 on one side is brought into contact with the other end portion 61b of the power lever 61.

Further, a plug 77 constituting a spring shoe for receiving an end portion of the damper spring 75 on the other side is brought into contact with an input receiving portion 34b of the input lever 34, which is mentioned later.

Elastic force of the respective damper spring 75 is operated between the power lever 61 and the input lever 34 via the guide plate 76 and the plug 77.

In the case of the embodiment, a spring constant of the damper spring 75 is set such that a change in a deceleration degree by impact force transmitted from the brake shoes 3 and 4 to the power lever 61 via the link mechanism 7 in braking becomes equal to or smaller than 0.05 G.

Specifically, for example, according to a drum brake for a small-sized truck, normally, by selecting the spring constant of the damper spring 75 to a pertinent value in a range of 10 through 20 kgf/mm, the change in the deceleration degree caused owing to eccentricity of the drum or the like in braking can be made to be equal to or smaller than 0.05 G.

The adjuster unit 8 is inherently for adjusting an distance between the end portions of the brake shoes 3 and 4 in accordance with progress of wear of linings of the respective brake shoes 3 and 4 and is constituted to automatically adjust the distance between the end portions of the brake shoes 3 and 4 by pivotal operation of an adjuster lever 82, a front end portion of which is brought into contact with an adjusting gear 8a on the adjuster unit 8 by urge force of the adjuster spring 81.

The adjuster lever 82 is connected with an adjuster drive mechanism 84. In the case of the embodiment, the adjuster drive mechanism 84 includes an adjuster link 85 rotatably supported by a web of the secondary shoe 4; a first adjuster rod 86, one end of which is connected to the anchor pin 10 and the other end of which is connected to the adjuster link 85; and a second adjuster rod 87, one end of which is connected to the adjuster link 85 and the other end of which is connected to the adjuster lever 82 and controls expansion of the adjuster unit 8 by operating pivotal force to the adjuster lever 82 in accordance with an amount of moving the secondary shoe 4 in braking.

As shown in FIG. 1 and FIG. 4 according to the embodiment, the link mechanism 7 for driving shoes is provided with a pair of upper and lower base plates 25 and 26 fittedly mounted pivotably to the anchor pin 10 erected on the backing plate 9; a secondary anchor pin 12 movable in a constant range along a direction of moving the secondary shoe 4 for receiving brake force (which is brake torque also referred to as anchor reaction force) from the secondary shoe 4 at a position separated from the anchor pin 10 in a peripheral direction of the drum in forward braking; a lever support pin 28 locked by the base plates 25 and 26 at a position separated from the anchor pin 10 on the base plates 25 and 26 to an inner side in the diameter direction of the drum; a primary anchor pin 11 movable in a constant range along a direction of moving the primary shoe 3 for receiving brake force from the primary shoe 3 at a position in the middle of the anchor pin 10 and the lever support pin 28 in rearward braking; a switch lever 32 and the input lever 34 contiguously arranged pivotably along with the anchor pins 11 and 12 and the lever support pin 28; and a set spring 101 for restricting pivotal movement of the base plates 25 and 26 to the side of the primary shoe 3 centering on the anchor pin 10.

The primary anchor pin 11 is mounted to an end portion of the primary shoe 3 and is supported between the base plates 25 and 26 by fitting both ends of the pin 11 to pin supporting long holes formed at the base plates 25 and 26. The primary anchor pin 11 is movable on the base plates 25 and 26 in a constant range along the direction of moving the primary shoe 3 by being fitted with the pin supporting long holes.

Further, the secondary anchor pin 12 is mounted to an end portion of the secondary shoe 4 and is supported between the base plates 25 and 26 by fitting the both ends of the pin 12 to pin supporting long holes formed at the base plates 25 and 26. The secondary anchor pin 12 is movable on the base plates 25 and 26 in a constant range along the direction of moving the secondary shoe 4 by being fitted with the pin supporting long holes.

All of the primary anchor pin 11, the secondary anchor pin 12 and the lever support pin 28 are brought into an integrated state of being integrated to the base plates 25 and 26 by mounting draw-preventive stop rings to shaft portions thereof inserted to the respective base plates 25 and 26.

Further, the pair of base plates 25 and 26 are plate members having substantially the same shape and are coupled with the primary anchor pin 11, the secondary anchor pin 12 and the lever support pin 28 in an opposed state sandwiching the switch lever 32 and the input lever 34.

According to the switch lever 32, as shown in FIG. 4, a base end thereof is pivotably supported by the lever support pin 28 and a front end portion thereof is provided with a pin contact portion 32b in contact with the primary anchor pin 11.

According to the input lever 34, as shown in FIG. 4, one end thereof is provided with the input receiving portion 34b for receiving shoe operating force of the operating force producing mechanism 6, and the other end thereof is provided with a shoe contact portion 34c in contact with one end of the secondary shoe 4. Further, a middle portion thereof is provided with an input transmitting portion 34a pivotably engaged with a side edge of a middle portion of the switch lever 32 on the side of the secondary shoe 4 in point contact for transmitting the shoe operating force $F_1$ inputted from the operating force producing mechanism 6 to the switch lever 32 and the secondary shoe 4.

The set springs 101 is for restricting the base plates 25 and 26 from pivoting around the anchor pin 10 by the shoe operating force operated to the lever support pin 28 via the input lever 34 and switch lever 32.

The set spring 101 is a compression coil spring mounted between a pair of spring seats 102 and 103 supported on the backing plate 9 and held above the backing plate 9 via the pair of spring seats 102 and 103.

The spring seat 102 on one side is provided such that a position thereof can be adjusted relative the base plates 25 and 26 by an adjusting screw 104. Further, the spring seat 103 on other side is brought into contact with the side edges of the base plates 25 and 26 and mounted to the backing plate 9 to be able to follow pivotal movement of the base plates 25 and 26 to the side of the primary shoe 3.

That is, a compressed length of the set spring 101 can be adjusted by changing a distance separating the spring seats 102 and 103 by the adjusting screw 104 and pivotal movement of the base plates 25 and 26 is restricted by operating spring force in accordance with the compressed length to the side edges of the base plates 25 and 26 via the spring seat 103.

The above-described link mechanism 7 is integrated to the backing plate 9 by integrating the anchor pins 11 and 12, the lever support pin 28, the switch lever 32 and the input lever 34 to the base plates 25 and 26 to thereby integrate a single unit and thereafter fitted to mounting the unit to the anchor pin 10.

According to the above-described drum brake 1, in forward braking or rearward braking, when the shoe operating force is inputted from the power lever 61 of the operating force producing mechanism 6 to the input lever 34 of the link mechanism 7 for driving the shoes, the input lever 34 starts pivoting with the shoe contact portion 34c or the input transmitting portion 34a as a fulcrum of rotation. Then, the middle portion of the switch lever 32 is pressed by the input transmitting portion 34a, and the secondary shoe 4 is urged in an expanding direction by the shoe contact portion 34c.

At this occasion, the pivotal movement of the pair of base plates 25 and 26 to the side of the primary shoe 3 with the anchor pin 10 as a rotational center is restricted by the set spring 101 and therefore, pivotal movement of the base plates 25 and 26 to the side of the primary shoe 3 is not brought about by pressing the switch lever 32 by the input lever 34.

Therefore, by pivotal movement of the input lever 34, the shoe operating force inputted from the input transmitting portion 34a of the input lever 34 to the switch lever 32 pivotally moves the switch lever 32 around the lever support pin 28 without reducing its effect by pivotal movement of the base plates 25 and 26. The pin contact portion 32b of the switch lever 32 presses the primary anchor pin 11 and meanwhile, the shoe contact portion 34c of the input lever 34 presses the secondary shoe 4. Accordingly, the respective brake shoes 3 and 4 are pressed to the inner peripheral face of the drum to thereby produce brake force.

Further, in the state of producing the brake force, when the brake force operated from the brake shoes 3 and 4 to a corresponding one of the primary anchor pin 11 or the secondary anchor pin 12 reaches a predetermined multiplication factor relative to the shoe operating force, the pair of base plates 25 and 26 are pivoted in a direction of resisting against the shoe operating force with the anchor pin 10 as a rotational center. Accordingly, brake restricting force for a reducing operation of the shoe operating force is exerted to the input lever 34 to thereby limit the press force of the respective brake shoes 3 and 4 to the drum. As a result, the drum brake can ensure both of high effect and stability of the brake force.

Further, when impact force is transmitted from the side of the brake shoes 3 and 4 to the operating force producing mechanism 6 via the link mechanism 7 by abrupt torque variation caused by eccentricity of the drum or the like in braking, the transmitted impact force is absorbed by elastically deforming the damper spring 75 arranged between the input lever 34 of the link mechanism 37 and the power lever 61 of the operating force producing mechanism 6. Therefore, the impact force is absorbed between the input lever 34 and the power lever 61 and is not transmitted to the electric motor 6 of the operating force producing mechanism 6 via the power lever 61.

Therefore, impact resistance of the electric motor 62 against impact force caused by torque variation in braking can be promoted without achieving an increase in allowable torque or promotion of impact resistance of the electric motor 62 per se and downsizing of the electric motor 62 can be realized.

Further, according to the embodiment, the damper spring 75 is constituted by two pieces of compression coil springs arranged in parallel between the power lever 61 and the input lever 34. Therefore, in comparison with a case of constituting the damper spring 75 by a single spring, a large spring constant can be ensured by small dimensions by an amount of reducing a diameter of winding the individual coil spring.

Further, a degree of freedom of arranging parts is promoted such as distributing and arranging the respective compression coil springs at vacant spaces on both sides of the power lever 61 and therefore, the respective compression coil springs can be integrated easily even in the drum where a mounting space is restricted. Accordingly, the brake apparatus can be easily made compact.

Further, according to the embodiment, the spring constant of the damper spring 75 is set such that the change in the deceleration degree by impact force transmitted from the brake shoes 3 and 4 to the power lever 61 via the link mechanism 7 in braking becomes equal to or smaller than 0.05 G. With such a degree of the change in the deceleration, kickback or the like accompanied by the change in the deceleration becomes very weak to a degree which cannot be felt by a driver or the like and the driver can carry out braking operation with excellent brake feeling.

Further, in the case of the embodiment, the power transmission system for transmitting the output of the electric motor 62 to the power lever 61, is integrated with the worm wheel apparatus 65 for preventing power transmission from the side of the power lever 61 to the side of the electric motor 62. Therefore, the power transmitting mechanism between the electric motor 62 and the link mechanism 7 for operating to expand the brake shoes 3 and 4 becomes an irreversible structure by which although the output of the motor is transmitted to the link mechanism 7, transmission torque from the link mechanism to the side of the electric motor 62 is restricted. Accordingly, braking force can be maintained even when electricity conduction to the electric motor 62 is stopped in braking.

Therefore, after stopping the vehicle as in the case of, for example, stopping the vehicle to await for change of traffic signal, the brake force at that occasion is maintained even when electricity conduction to the electric motor 62 is stopped. Accordingly, the state of stopping the vehicle can be maintained and reduction of power consumption at the electric motor 62 can be achieved.

As described above, according to the drum brake of the present invention, when impact force is transmitted from the side of the brake shoes to the operating force producing mechanism via the link mechanism by abrupt torque variation caused by eccentricity of the drum or the like in braking, the transmitted impact force is absorbed by elastically deforming the damper spring arranged between the input lever of the link mechanism and the power lever of the operating force producing mechanism. Therefore, the impact force is absorbed between the input lever and the power lever and is not transmitted to the electric motor of the operating force producing mechanism via the power lever.

Therefore, impact resistance of the electric motor against impact force caused by the torque variation in braking can be promoted without achieving increase in allowable torque and promotion of impact resistance of the electric motor per se, and downsizing of the electric motor can be achieved.

Further, according to the second aspect of the present invention, assuming, for example, compression springs as the damper spring, in comparison with the case of constituting the damper spring by a single spring, large spring constant can be ensured with small dimensions by an amount of reducing a diameter of winding the individual coil spring used. Further, the degree of freedom of arranging parts is also promoted such as distributing and arranging the respective operational coil springs at vacant spaces on both sides of the power lever. Accordingly, even in the drum in which the mounting space is restricted, the compression coil springs can be assembled easily, and the brake apparatus is easily made compact.

Further, according to the third aspect of the present invention, the operation of kickback or the like accompanied by the change in the deceleration produced by impact force caused by the torque variation becomes very weak to a degree which cannot be felt by a driver or the like and the driver can operate to brake with excellent braking feeling.

Further, according to the fourth aspect of the present invention, the power transmission mechanism between the electric motor and the link mechanism for operating to expand the brake shoes can be made an irreversible structure in which although the output of the motor is transmitted to the link mechanism, the torque transmission from the link mechanism to the electric motor is restricted. Accordingly, even when electricity conduction to the electric motor is stopped in braking, the braking force can be maintained.

Therefore, even when electricity conduction to the electric motor is stopped after stopping the vehicle as in the case of stopping the vehicle, for example, for awaiting for a change in traffic signal, the braking force at that moment is maintained and the state of stopping the vehicle can be maintained, and reduction of power consumption in the electric motor can be achieved.

What is claimed is:

1. A drum brake comprising:

a pair of brake shoes opposedly arranged inside a drum;

an operating force producing mechanism for driving a power lever constituting an output portion of a shoe operating force by an electric motor;

link mechanism, for driving said brake shoes, including an input lever for receiving the shoe operating force outputted from said power lever, wherein said link mechanism presses said brake shoes to a drum and operates a brake restricting force to said input lever in a direction of a reducing operation of the shoe operating force in accordance with a brake force operated from said brake shoes to an anchor portion for controlling a press force of said brake shoes to said drum;

a damper spring between said power lever and said input lever, for transmitting the shoe operating force outputted from said power lever to said input lever and for absorbing an impact force transmitted from said brake shoes to said power lever via said link mechanism in braking.

2. The drum brake according to claim 1, wherein plural pieces of said damper springs are arranged in parallel between said power lever and said input lever.

3. The drum brake according to claim 1, wherein said damper spring has a spring constant such that a change in a deceleration by the impact force transmitted from said brake shoes to said power lever via said link mechanism in braking becomes equal to or smaller than 0.05 G.

4. The drum brake according to claim 2, wherein said damper spring has a spring constant such that a change in a deceleration by the impact force transmitted from said brake shoes to said power lever via said link mechanism in braking becomes equal to or smaller than 0.05 G.

5. The drum brake according to claim 1, wherein said operating force producing mechanism includes a power transmitting system for transmitting an output of said electric motor to said power lever, said power transmitting system including a worm wheel apparatus for preventing power from being transmitted from said power lever to said electric motor.

6. The drum brake according to claim 2, wherein said operating force producing mechanism includes a power transmitting system for transmitting an output of said electric motor to said power lever, said power transmitting system including a worm wheel apparatus for preventing power from being transmitted from said power lever to said electric motor.

7. The drum brake according to claim 3, wherein said operating force producing mechanism includes a power transmitting system for transmitting an output of said electric motor to said power lever, said power transmitting system including a worm wheel apparatus for preventing power from being transmitted from said power lever to said electric motor.

8. The drum brake according to claim 4, wherein said operating force producing mechanism includes a power transmitting system for transmitting an output of said electric motor to said power lever, said power transmitting system including a worm wheel apparatus for preventing power from being transmitted from said power lever to said electric motor.

* * * * *

UNITED STATES PATENT AND TRADEMARK OFFICE
CERTIFICATE OF CORRECTION

PATENT NO. : 6,408,994 B1
DATED : June 25, 2002
INVENTOR(S) : Toshifumi Maehara It is certified that error appears in the above-identified patent and that said Letters Patent is hereby corrected as shown below:

<u>Title page,</u>
Item [73], Assignee, delete "Akebon O" and insert -- Akebono --.

Signed and Sealed this

Third Day of December, 2002

JAMES E. ROGAN
*Director of the United States Patent and Trademark Office*